CAPACITANCE TO D.C. VOLTAGE CONVERTER
Filed Oct. 14, 1963
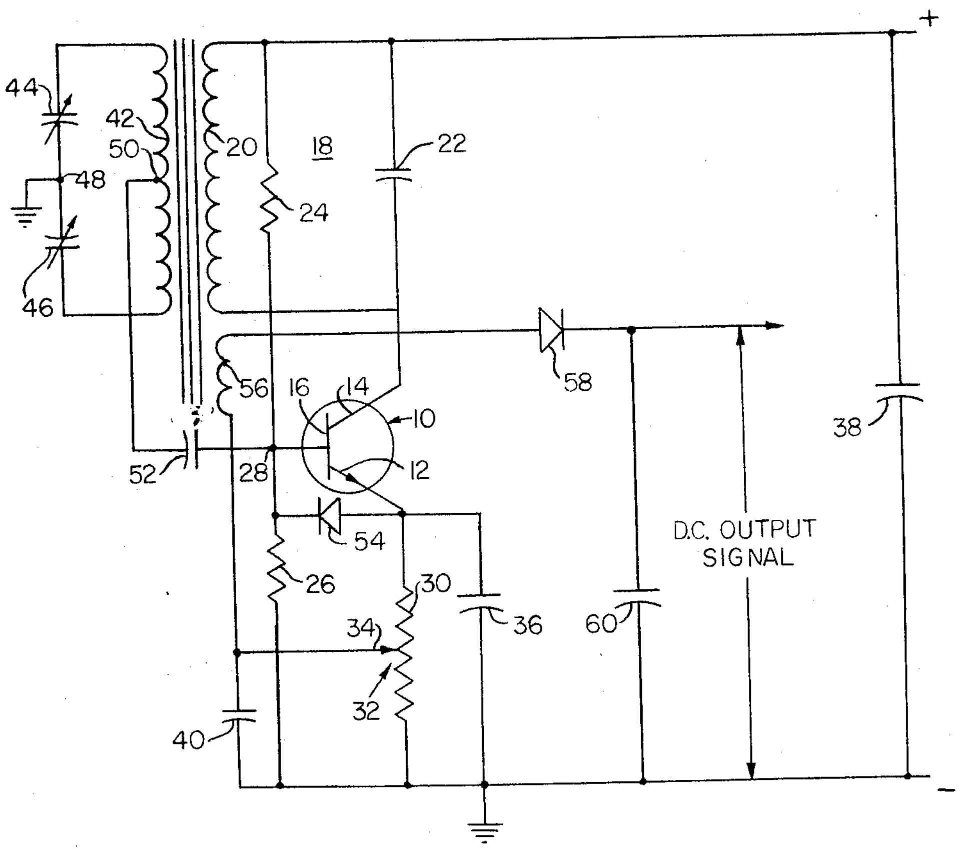
JOHN J. COYNE
EGILS EVALDS INVENTORS
BY Robert L. Marben
ATTORNEY

United States Patent Office 3,295,042
Patented Dec. 27, 1966

3,295,042

CAPACITANCE TO D.C. VOLTAGE CONVERTER

Egils Evalds and John J. Coyne, Philadelphia, Pa., assignors to Robertshaw Controls Company, Richmond, Va., a corporation of Delaware

Filed Oct. 14, 1963, Ser. No. 315,834
6 Claims. (Cl. 321—2)

The invention presented herein relates to capacitance to D.C. voltage converters and more particularly to such converters using a capacitance change to control the output of an oscillator which is rectified to produce a D.C. voltage output signal.

Capacitance to D.C. voltage converters provide an excellent means for developing a voltage signal which is proportional to a change in capacitance whereby a bistable means can be operated for control and/or indicating purposes. Such converters, however, should have high sensitivity and provide an unambiguous D.C. voltage output signal to be commercially acceptable.

A capacitance to D.C. voltage converter which embodies this invention includes an oscillator having a parallel tuned tank circuit connected to a transistor with an inductance-capacitance feedback bridge circuit inductively coupled to the tuned tank circuit. One of the two capacitance legs provides the bridge zeroing or "set" capacitance while the other capacitance leg provides the sensing or input capacitance. The bridge when unbalanced in one direction provides a positive feedback signal which is applied to the transistor to sustain the oscillations. The amplitude of oscillation is proportional to the bridge unbalance in the positive feedback direction and the gain of the transistor and is inversely proportional to the load or resistive losses of the tuned circuit.

While a winding inductively coupled to the tank circuit could be used to provide an A.C. output signal for rectification to produce a D.C. voltage output signal which varies in proportion to the degree of unbalance of the D.C. capacitance bridge, a D.C. output signal so produced has serious limitations. Thus, large unbalances of the bridge overload the oscillator causing "superregeneration" or quenched oscillation which at times does not have enough average power to provide a sufficient D.C. signal after rectification for proper actuation of a bistable means to be used with the converter. Under such conditions the small D.C. voltage output signal would produce an ambiguous condition since the bistable means would operate as though the inductance-capacitance bridge were balanced or unbalanced in the direction to provide a negative feedback signal when the inductance-capacitance bridge is actually in an extreme condition of unbalance in the direction for positive feedback. In addition, such an oscillator output circuit results in load of the oscillator further reducing the amplitude of oscillation and upsetting the operating point of the oscillator.

Accordingly, an object of this invention is to provide a capacitance to D.C. voltage converter using an oscillator in which an output signal from the oscillator is obtained in a manner which minimizes the loading of the oscillator and at the same time provides an adequate D.C. output signal when a condition of "superregeneration" or quenched oscillation exists.

Still another object is to provide a capacitance to D.C. voltage converter in which a portion of the D.C. voltage output signal is derived independent of the input capacitance.

A further object of the invention is to provide a transistorized capacitance to D.C. voltage converter in which a protection is provided for the transistor in cases where the back voltage peaks accompanying large bridge unbalances are great enough to destroy the transistor.

Other objects and advantages of the invention will become apparent from consideration of the specification and claims taken together with the accompanying drawing which is a circuit diagram of a capacitance to D.C. voltage converter embodying the invention.

Referring now to the drawing, the capacitance to D.C. voltage converter comprises a transistor oscillator using an inductance-capacitance feedback bridge circuit to vary the level of oscillation as a function of the unbalance of the bridge. The oscillator includes a transistor 10 having an emitter, base and collector which are identified by reference numbers 12, 14 and 16, respectively. The transistor 10 is connected as a common-emitter RF amplifier with a parallel tuned tank circuit 18 connected to the collector 14. The tuned tank circuit includes a winding 20 and a parallel connected capacitor 22. One side of the tank is connected to the positive side of a D.C. power source (not shown) while the other side is connected to the collector 14. The base 16 is connected to the connection 28 common to the series connected resistors 24 and 26. The emitter 12 is connected to ground via the resistance 30 of a voltage divider. A potentiometer 32 including the resistor 30 and a movable contact 34 illustrates one form of voltage divider that may be used. It is also possible to use two series connected resistors in place of the resistance 30 where a fixed voltage division is adequate. A by-pass capacitor 36 is connected in parallel with the resistor 30 to provide a path for the RF signal. A by-pass capacitor 38 is also connected between the positive side and ground of the D.C. power supply. A by-pass for the RF signal is also provided around the lower half of the resistance 30 by capacitor 40 connected between the movable contact 34 and ground.

The inductance-capacitance feedback bridge circuit includes a winding 42 inductively coupled to the winding 20 and two series connected variable capacitances 44 and 46 connected in parallel with the winding 42. The input signal for the bridge is the signal induced in the winding 42 coupled to the tank circuit 18. The output from the bridge is obtained between the connection 48 which is common to the capacitances 44 and 46 and a connection 50 intermediate the ends of the winding 42. The connection 48 is connected to ground and connection 50 is coupled to the base 16 of transistor 10 via a coupling capacitor 52. Thus, with one of the capacitances 44 and 46 used as a "set" or bridge zeroing capacitance, the other capacitance is used as the sensing capacitance which varies to unbalance the bridge. Unbalance in one direction provides a negative feedback signal to the transistor 10 at the freqeuncy determined by the value of the tank winding 20 and the capacitor 22. With a negative feedback signal applied to the transistor 10, no oscillation is present. Unbalance in the opposite direction applies a positive feedback signal to the transistor 10 causing oscillations to be established. The amplitude of oscillation is proportional to the bridge unbalance in the positive feedback direction and to the gain of the transistor 10. The capacitance leg selected as the "set" or bridge zeroing leg determines whether a low or high fail safe operation is provided when the converter circuit is used to provide the necessary signal for operation of an electromechanical or electronic bistable means. Since the connection 48 common to the capacitance legs 44 and 46 is connected to ground, it is a simple matter to change from low to high or high to low fail safe operation by merely interchanging the connections of the capacitance legs to the winding 42.

A diode 54 is connected between the emitter 12 and base 14 and is poled opposite to the base-emitter junction of transtsitor 10. The function of the diode 54 is discussed in connection with the operation of the converter.

While the amplitude of oscillation is proportional to the bridge unbalance in the positive feedback direction and the gain of the transistor 10, it is inversely proportional to the loading or resistive losses in the total tuned circuit. The loading is minimized by using a small number of turns for a load winding 56 which is inductively coupled to the winding 20 of the tuned tank circuit 18. One end of the load winding 56 is connected to the movable contact 34 of the potentiometer 32 while the other end of the load winding 56 is connected to a diode 58 which is poled to pass the D.C. voltage developed by the emitter current flowing through resistance 30 between the contact 34 and ground. A capacitor 60 is connected between the output side or cathode of the diode 58 to smooth out the voltage developed by the output circuit.

The demodulated or D.C. voltage output signal circuit just described forms an important part of this invention in that it provides a portion of the D.C. output signal which is independent of the oscillations produced by the oscillator portion of the converter. This portion of the D.C. output signal is developed by the quiescent emitter current flow through the emitter resistance 30 and appears across the portion of the resistance 30 between the contact 34 and ground. The remaining portion of the desired D.C. voltage output signal is derived from the RF power obtained from the oscillator via the inductively coupled load winding 56. Thus, the loading of the oscillator is minimized which adds to the stability and sensitivity of the converter. The voltage divider connected to the emitter 12 can be used to select the desired portion of the D.C. output signal to be obtained from the emitter current passing through the emitter resistance 30.

Another important function of the tapped emitter resistance 30 comes into play when a large unbalance exists at the bridge. Since the transistor 10 provides very high gain, only a small unbalance of the bridge is needed for the oscillator to develop full output. Thus, when a large unbalance of the bridge occurs, the oscillator is heavily overloaded causing "superregeneration" or quenched oscillation which at times may not have enough average power in the modulated envelope to provide the additional D.C. power after rectification by the diode 58 to develop the desired D.C. voltage output signal. During a "superregenerative" condition diode 54 shunt rectifies negative pulses to produce more base current which is amplified by the transistor 10 to produce a higher emitter current, and thereby, a higher voltage drop across the emitter resistance 30, a portion of which voltage is applied to the output via the winding 56 and diode 58. Without this voltage rise across the emitter resistor 30 at a time when the average power developed in the RF envelope decreases, the necessary D.C. output signal indicative of bridge unbalance would not be supplied and the output signal would indicate a bridge balance condition when in fact a large unbalance is present. Thus, the emitter resistance portion connected in the output circuit for the converter prevents the converter from producing an ambiguous D.C. voltage output signal during a condition of large bridge unbalance.

The diode 54 is important when parameters of the converter circuit are such that the back voltage peaks caused by large bridge unbalance are large enough to destroy the transistor. Since the diode 54 is poled opposite to the base-emitter junction, the junction will be protected from any such back voltage peaks.

Modification of the embodiment shown and described will readily occur to those skilled in the art. Accordingly, the scope of the invention presented herein is intended to be limited only as defined in the appended claims which should be accorded a breadth of interpretation consistent with this specification.

What is claimed is:

1. A capacitance to D.C. voltage converter energized from a D.C. power supply comprising a sensing capacitor; a resistor; a transistor oscillator including said capacitor and said resistor, said oscillator producing an oscillating signal having an amplitude which varies in proportion to the change in the capacitance of said sensing capacitor and having a quiescent current which flows through said resistor; an output circuit including a winding, a diode and a portion of said resistor connected in series, said winding being inductively coupled to said oscillator whereby said output circuit provides a D.C. voltage output signal which is proportional to said oscillating signal and the voltage developed across said portion of said resistor by said quiescent current.

2. A capacitance to D.C. voltage converter energized from a D.C. power supply comprising a transistor having an emitter, base and collector, said transistor connected in common emitter configuration; a resistor connected between said emitter and the D.C. power supply; a tank circuit connected between said collector and the D.C. power supply; a feedback circuit connected to said base and inductively coupled to said tank circuit and including a variable capacitor, said feedback circuit providing a positive feedback signal to said base upon variation of said capacitor whereby sustained oscillations are produced in said tank circuit; an output circuit loop including a winding inductively coupled to said tank circuit, a rectifier and a portion of said resistor whereby a D.C. output signal is produced from the rectification of the oscillations induced in said winding by said rectifier and the voltage developed across said portion of said resistor by the emitter current.

3. A capacitance to D.C. voltage converter energized from a D.C. power supply comprising a transistor having an emitter, base and collector, said transistor connected in common emitter configuration; a resistor connected between said emitter and the D.C. power supply; a tank circuit connected between said collector and the D.C. power supply; an inductance-capacitance bridge inductively coupled to said tank circuit and connected to said base whereby a positive feedback signal is supplied to said transistor upon unbalance of said bridge in one direction whereby sustained oscillations are produced in said tank circuit; an output circuit loop including a winding inductively coupled to said tank circuit, a rectifier and a portion of said resistor whereby a D.C. output signal is produced from the rectification of the oscillations induced in said winding by said rectifier and the voltage developed across said portion of said resistor by the emitter current.

4. A capacitance to D.C. voltage converter energized from a D.C. power supply comprising a sensing capacitor; a resistive voltage divider; a transistor oscillator including said capacitor and said resistor, said oscillator producing an oscillating signal having an amplitude which varies in proportion to the change in the capacitance of said sensing capacitor and having a quiescent current which flows through said voltage divider; an output circuit including a winding, a diode and a portion of said voltage divider connected in series, said winding being inductively coupled to said oscillator whereby said output circuit provides a D.C. voltage output signal which is proportional to said oscillating signal and the voltage developed across said portion of said voltage divider by said quiescent current.

5. A capacitance to D.C. voltage converter energized from a D.C. power supply comprising a transistor having an emitter, base and collector, said transistor connected in common emitter configuration; a resistor connected between said emitter and the D.C. power supply; a tank circuit connected between said collector and the D.C. power supply; an inductance-capacitance bridge inductively coupled to said tank circuit and connected to said base whereby a positive feedback signal is supplied to said transistor upon unbalance of said bridge in one direction whereby sustained oscillations are produced in said tank circuit; a diode connected between said base and said emitter and poled opposite to the junction formed by said base and said emitter; an output circuit including a winding, a diode and a portion of said resistor connected in series whereby a D.C. output signal is produced from the rectification of the oscillations induced in said winding by said last mentioned diode and the voltage developed across said portion of said resistor by the emitter current.

6. A capacitance to D.C. voltage converter energized from a D.C. power supply comprising a transistor having an emitter, base and collector, said transistor connected in common emitter configuration; a resistive voltage divider connected between said emitter and the D.C. supply; a tank circuit connected between said collector and the D.C. power supply; a variable capacitor; a feedback circuit controlled by variations of said capacitor and inductively coupled to said tank circuit and connected to said base whereby variation in said capacitor causes said feedback circuit to supply said transistor with a positive feedback signal whereby oscillations are produced in said tank circuit; a diode connected between said base and said emitter and poled opposite to the junction formed by said base and said emitter; an output circuit loop including a winding inductively coupled to said tank circuit, a diode and a portion of said resistive voltage divider whereby a D.C. output signal is produced from the rectification of the oscillations induced in said winding by said last-mentioned diode and the voltage developed across said portion of said voltage divider by the emitter current.

No references cited.

JOHN F. COUCH, *Primary Examiner.*

W. H. BEHA, *Assistant Examiner.*